(12) United States Patent
Mossoba et al.

(10) Patent No.: US 11,379,820 B2
(45) Date of Patent: Jul. 5, 2022

(54) EXPRESSIVE DIGITAL CONTENT USING PAYMENT QR CODES

(71) Applicant: Capital One Services, LLC, McLean, VA (US)

(72) Inventors: Michael Mossoba, Arlington, VA (US); Abdelkader M'Hamed Benkreira, New York, NY (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/387,975

(22) Filed: Apr. 18, 2019

(65) Prior Publication Data

US 2020/0334660 A1 Oct. 22, 2020

(51) Int. Cl.
*G06Q 40/00* (2012.01)
*G06Q 20/32* (2012.01)
*G06Q 20/22* (2012.01)
*G06F 40/205* (2020.01)

(52) U.S. Cl.
CPC ....... *G06Q 20/3276* (2013.01); *G06F 40/205* (2020.01); *G06Q 20/223* (2013.01)

(58) Field of Classification Search
CPC .............................. G06Q 40/00; H04L 29/08
USPC ......................................................... 705/41
See application file for complete search history.

(56) References Cited

U.S. PATENT DOCUMENTS

| | | | |
|---|---|---|---|
| 9,443,263 B1 | 9/2016 | Kim | |
| 2013/0173256 A1* | 7/2013 | Eggebraaten | G06F 40/40 704/9 |
| 2014/0019352 A1* | 1/2014 | Shrivastava | G06Q 20/384 705/41 |
| 2014/0100973 A1 | 4/2014 | Brown et al. | |
| 2016/0261675 A1* | 9/2016 | Block | G06F 3/04842 |
| 2017/0011383 A1 | 1/2017 | Melzer | |
| 2018/0075442 A1* | 3/2018 | Tyler | G06Q 20/3226 |

* cited by examiner

*Primary Examiner* — Ojo O Oyebisi
(74) *Attorney, Agent, or Firm* — DLA Piper LLP (US)

(57) ABSTRACT

Provided, in an aspect, is a method for performing a peer-to-peer transaction with a graphical construct on a first mobile device including a processor. The method includes receiving, by the processor, a user input for performing the peer-to-peer transaction; capturing, by the processor, one or more user intents of the received user input; determining, by the processor, an expressive element in accordance with the captured one or more user intents; generating, by the processor, the graphical construct from a customization of the expressive element; and performing, by the processor, the peer-to-peer transaction with a second mobile device in communication with the first mobile device by presenting the generated graphical construct. In some embodiments, capturing one or more user intents of the received user input is based on natural language processing (NLP).

15 Claims, 7 Drawing Sheets

EXPRESSIVE DIGITAL CONTENT USING PAYMENT QR CODES

BACKGROUND

Quick response (QR) code is a matrix bar code that stores data in two dimensions. Each QR code includes position, alignment, and timing information that is used by a QR code reader to read information stored by the QR code. QR codes are used to store information in such a way that the information can be read using a machine called a QR code reader. QR codes can be quickly generated using a software program installed on a machine. A smart phone or other mobile communication device equipped with a camera can be easily configured to read QR codes. Because QR codes are easy to generate and can store alphanumeric characters in the range of 10 to 4096, QR codes may be used to store an address of an Internet website.

QR codes are becoming ubiquitous in printed media, including media published for performing online transactions. QR codes may be printed on newspapers, magazines, flyers, business cards, signs, containers, and other surfaces. QR codes may be projected onto a screen or other surface (e.g., a building). QR codes may be displayed on a computer screen, touch screen, or the like. QR codes comprise an active portion readable by a machine that is typically black and a background portion that provides contrast to the active portions and is typically white.

Because a user may be exposed to a large number of QR codes, the user may ignore or disregard a QR code, or may find the QR code very boring especially while performing an online transaction. Further, a user may download or save a QR code for later access knowing a website identified by the QR code at the time of the download. However, the QR code is not readable by a human so the user may later forget the reason for downloading a payment QR code. In some instances, the user may simply delete the QR code without reading it or may re-download the same payment QR code. A user may also receive a payment QR code from another user in, for example, an email or image message but the received payment QR code may not include a label or other human-readable identifier for the user to determine the nature of the information stored by the payment QR code.

SUMMARY

In an aspect of the present disclosure, a method for performing a peer-to-peer transaction with a graphical construct on a first mobile device including a processor, includes receiving, by the processor, a user input for performing the peer-to-peer transaction; capturing, by the processor, one or more user intents of the received user input; determining, by the processor, an expressive element in accordance with the captured one or more user intents; generating, by the processor, the graphical construct from a customization of the expressive element; and performing, by the processor, the peer-to-peer transaction with a second mobile device in communication with the first mobile device by presenting the generated graphical construct. In some embodiments, capturing one or more user intents of the received user input further includes receiving, by a natural language processing (NLP) module coupled to the processor, text specifying predetermined evidence, extracting, by the NLP module, text in the user input, the one or more text comprising conditions, logical operators, and criteria for evidence, decomposing, by the NLP module, the text into coarse grained text fragments, including grouping text segments as coarse grained text fragments using the logical operators, analyzing, by the NLP module, each coarse grained text fragment to identify conditions within the coarse grained text fragment, evaluating, by the NLP module, each identified condition in accordance with the predetermined evidence evaluating, by the NLP module, each coarse grained text fragment based on the identified condition evaluations and the logical operators of the coarse grained text fragment; and predicting, by the NLP module, from the evaluations of each coarse grained text fragments, one or more user intents of the received user input indicating a degree to which the evidence meets the criteria of the text.

In some embodiments, capturing one or more user intents of the received user input is based on determining one or more life events from the received user input. In some embodiments, the processor customizes the expressive element in accordance with a payment information of the peer-to-peer transaction. In some embodiments, the processor customizes the expressive element by identifying one or more sentiments associated with the peer-to-peer transaction; and modifying a QR code of the expressive element in accordance with the identified sentiments. In some embodiments, the processor customizes the expressive element by determining a placement of the expressive element on a content displayed on the first mobile device. In some embodiments, the processor generates the graphical construct from the customization of the expressive element by performing a modification of a text represented in the expressive element. In some embodiments, the processor generates the graphical construct from the customization of the expressive element by performing a modification of a size of one or more objects within the expressive element. In some embodiments, the processor generates the graphical construct from the customization of the expressive element by performing a modification of an aspect ratio of a payment QR code. In some embodiments, the processor is configured to determine the expressive element by overlaying a human-readable image onto a machine-readable QR code.

Another aspect of the disclosure relates to a system for performing a peer-to-peer transaction between a first mobile device and a second mobile device using a graphical construct includes a database, an application server and one or more processors. The one or more processors are configured to receive a user input from the first mobile device for performing the peer-to-peer transaction; capture one or more user intents of the received user input; determine an expressive element in accordance with the captured one or more user intents; generate the graphical construct from a customization of the expressive element; present the graphical construct to the second mobile device in communication with the first mobile device; and perform an online payment associated with the peer-to-peer transaction based on the presented graphical construct.

In some embodiments, the one or more processors capture one or more user intents of the received user input based on determining one or more life events from the received user input. In some embodiments, the one or more processors customize the expressive element in accordance with a payment information of the peer-to-peer transaction. In some embodiments, the one or more processors customize the expressive element by: identifying one or more sentiments associated with the peer-to-peer transaction; and modifying a QR code of the expressive element in accordance with the identified one or more sentiments. In some embodiments, the one or more processors generate the graphical construct from the customization of the expressive content by performing a modification of a text represented by the expressive element. In some embodiments, the one or more processors customize the expressive element by determining a placement of the expressive element on a content displayed on the first mobile device. In some embodiments, the one or more processors generate the graphical construct from the customization of the expressive element by performing a modification of at least one of: a size of one or more objects within the expressive element, or an aspect ratio of a payment QR code. In some embodiments, the one or more processors determine the expressive element by overlaying a human-readable image onto a machine-readable QR code.

Another aspect of the disclosure relates to a computer program product that includes a non-transitory computer-readable storage medium having instructions encoded thereon that, when executed by a processor, cause the processor to: receive, by the processor, a graphical construct comprising an expressive element associated with a peer-to-peer transaction, wherein the expressive element comprises a payment QR code and a human-readable image; extract, by the processor, payment information from the payment QR code of the expressive element from the received graphical construct; and perform, by the processor, an online payment associated with the peer-to-peer transaction in accordance with the extracted payment information.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

Figure 1:
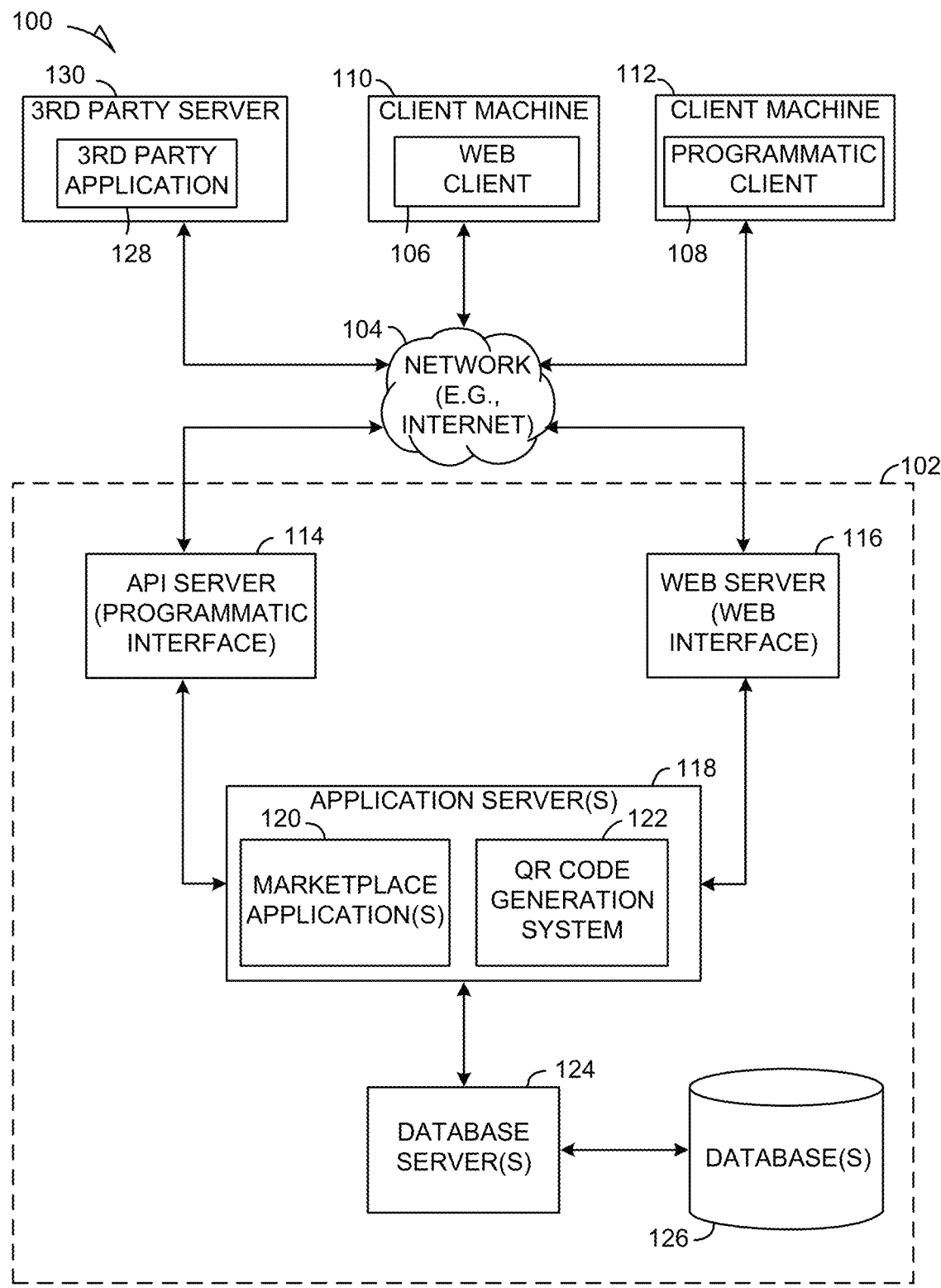
FIG. 1 is a block diagram illustrating an example network environment including a QR code generation system, according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

In one aspect, the present disclosure relates to a system that generates and provides more expressive payments for peer-to-peer transactions. Typically, today when a payer wants to make a payment to a payee, the payer just specifies who the payment is from, to, the amount, and chooses a payment method. With the popularity of emojis online and digital avatars, the disclosed system enables making the payment process more expressive. Use of more expressive content in the payment process may increase user interest in the payment process, thereby driving customer engagement or increasing customer goodwill with a company offering the payment process. In some configurations, the system performs a peer-to-peer transaction with a graphical construct on a mobile device. The system can receive a user input for performing the peer-to-peer transaction, capture one or more user intents of the received user input, determine an expressive element in accordance with the captured user intent, and generate the graphical construct from a customization of the expressive element. After the system creates the graphical construct, there is a transfer of the expressive digital content from one user to another user. Within the QR code of the graphical construct, the system can embed relevant payment information (e.g. the from, the to, the amount, and any other additional data that would be relevant, such as the memo line of a check). In some configurations, the system can automatically gather intent from the payment information. In alternate configurations, the system can gather the intent from options selected by the user, and then could automatically generate the expressive digital content.

In some embodiments, capturing one or more user intents of the received user input is based on natural language processing (NLP). As described herein, NLP relates to a field of computer science and linguistics concerned with the interactions between computers and human (natural) languages. NLP as a field of computer science began as a branch of artificial intelligence. Modern NLP algorithms are grounded in machine learning, especially statistical machine learning.

In some configurations, the system can dynamically adjust variable aspects of an emoji template, and can also change the text that is represented in an emoji template, or the color of the emoji, or the size of certain elements within the emoji template. The system could also adjust variable aspects of the QR code template. The QR code itself does not have to be just a series of black and white boxes. Colors or images could be embedded in certain parts of the QR code. The system can also dynamically adjust the location of a QR code in an emoji template. For example, a QR code could appear on an avatar's t-shirt, or on the avatar's palm, or in the corner of a human-readable image.

Applications

In one aspect, the present disclosure makes an online transaction more expressive for a customer of a financial service provider. In a different aspect, a person may also take the expressive digital content to a bank and a teller may be able to read the QR code and verify the identity of the person. Additionally, a person can go to an ATM and present the QR code in the expressive digital content and swipe a credit card to identify themselves. In yet another aspect, a cross-bank peer-to-peer payment transfer system may be used to send money to a customer of a first financial service provider from a second financial service provider. The cross-bank peer-to-peer payment transfer system can look up who the sender is, how much the payment is, and send the payment forward from the expressive digital content disclosed herein. In a different aspect, an intra-bank peer-to-peer payment transfer system may be used to send money.

The intra-bank peer-to-peer payment transfer system can send the payment forward based on the expressive digital content disclosed herein.

System Architecture

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser, such as Internet Explorer), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and a QR code generation system 122. The application servers 118 are, in turn, shown to be coupled to one or more database servers 124 that facilitate access to one or more databases 126.

The marketplace applications 120 may provide a number of marketplace functions and services to users that access the networked system 102. The marketplace applications 120 may publish or distribute QR codes as online content. The QR code generation system 122 may accordingly provide a QR generation and modification service to the marketplace applications 120 or to users. While the marketplace applications 120 and the QR code generation system 122 are shown in FIG. 1 to both form part of the networked system 102, it will be appreciated that, in alternative embodiments, the QR code generation system 122 may form part of a QR code provisioning system that is separate and distinct from the networked system 102.

Further, while the system 100 shown in FIG. 1 employs a client-server architecture, the present disclosure is of course not limited to such an architecture, and could equally well find application in a distributed or peer-to-peer architecture system, for example. The various marketplace applications 120 and the QR code generation system 122 can also be implemented as standalone software programs, which do not necessarily have networking capabilities.

The web client 106 accesses the various marketplace applications 120 and the QR code generation system 122 via the web interface supported by the web server 116. Similarly, the programmatic client 108 accesses the various services and functions provided by the marketplace applications 120 and the QR code generation system 122 via the programmatic interface provided by the API server 114. The programmatic client 108 may, for example, be a seller application (e.g., the Auto Navigator application developed by Capital One Financial Corporation (McLean, Va.)) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
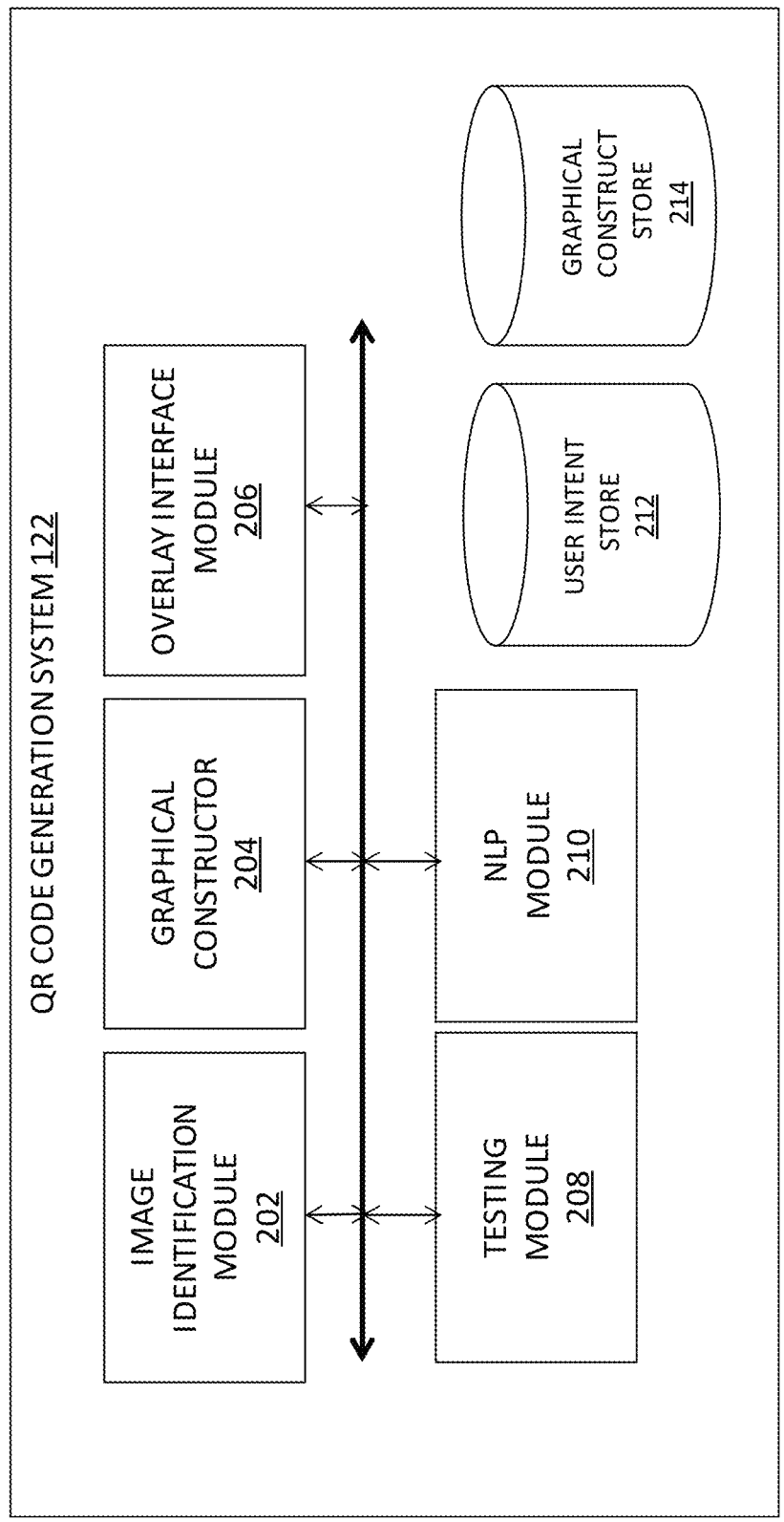
FIG. 2 is a diagrammatic representation of QR code generation for creating an expressive digital content, according to some embodiments of the present disclosure.

FIG. 2 is an exemplary embodiment of a QR code generation system 122, according to some aspects of the present disclosure. In some embodiments, the QR code generation system 122 may be implemented as a stand-alone QR code generation system 122, while in alternate embodiments it may be provided as a web-based service. The QR code generation system 122 may comprise a number of modules implemented in hardware, software, or a combination of hardware and software. The QR code generation system 122 may be configured to generate a graphical construct from a machine-readable QR code having a human-readable image embedded therein. In some embodiments, the machine-readable QR code is encoded with an identifier that identifies information used to actually perform a peer-to-peer transaction.

An image identification module 202 can identify an image to be embedded in a QR code. The image may be received as a selection from a user, may be generated by the user, or may be otherwise identified. The image may include one or more alphanumeric characters. The image identification module 202 may evaluate the image to determine that the image meets one or more requirements before being embedded. These requirements may include a minimum resolution, a maximum number of colors, a maximum size, or the like.

A graphical constructor 204 can generate an expressive digital content (also referred to as a graphical construct) based on an identified image (e.g. an emoji template), and a QR code. As shown in FIG. 2, the graphical constructor 204 stores the generated expressive digital content in a graphical construct store 214. In some embodiments, the graphical constructor 204 can dynamically adjust variable aspects of an emoji template, and can also change a text that is represented in an emoji template, color of the emoji template, or the size of certain elements within the emoji template. The graphical constructor 204 can also adjust variable aspects of the QR code in the expressive digital content. The graphical constructor 204 can also dynamically adjust the location of a QR code in an emoji template. For example, the graphical constructor 204 can place a QR code to appear on an avatar's t-shirt, on the avatar's palm, or in the corner of a human-readable image. In some embodiments, aspects of the QR code or placement of the QR code may be varied automatically based on one or more stored rules. In other embodiments, aspects of the QR code or placement of the QR code may be varied based on input from a user.

The graphical constructor 204 can also generate a primitive QR code based on a human-readable image. Prior to generating the primitive QR code, the graphical constructor 204 may resize the image so that the image has the same dimensions as the QR code. If the image has larger dimensions than the QR code, the graphical constructor 204 may shrink or crop the image. If the image has smaller dimensions than the QR code, the graphical constructor 204 may expand or magnify the image or add a border around the image. The graphical constructor 204 can generate the expressive digital content by embedding the primitive QR code onto an emoji template. For example, as described below in conjunction with FIG. 5B, the graphical constructor 204 can generate the expressive digital content by embedding the primitive QR code adjacent to an avatar (i.e. a digital content with an expression or mood) and a text associated with the expression. In this example, the QR code may be embedded adjacent to the avatar based on a stored emoji template or rule governing where to place a QR code relative to expressive content.

The primitive QR code comprises a first iteration of a QR code having an image embedded therein. The primitive QR code may include a QR code that is not necessarily machine-readable and an image that is not necessarily human-readable. The primitive QR code may be generated in a variety of ways. For example, the primitive QR code may be generated according to a version of the QR code selected by the user, or a version of the QR code may be automatically selected based on a number of alphanumeric characters to be encoded in the QR code. For example, the primitive may be generated by creating a machine-readable QR code on a solid-color background (e.g., creating a black-color QR code on a white background) and overlaying the image onto the generated QR code. The solid-color background may be white, black, or another color. The color of the solid-color background may be selected based on a characteristic of the image. For example, if the image contains mostly dark colors, the solid-color background may be black. The QR code itself may appear white on the black background. If the image contains mostly light colors, a white background and black QR code may be selected. In some instances, a brightness of the image may be determined automatically or be received as an input from the user.

In other embodiments, the QR code may be generated on the image so that the image itself is the background of the generated QR code. For example, a particular QR code may be generated based upon a brightness or other attributes of the image, such as the images color or texture. The image may be analyzed to determine if the image contains mostly dark colors or mostly light colors. If the image contains mostly light colors, the QR code may be generated in black. If the image contains mostly dark colors, the QR code may be generated in white. The QR code may be generated in other colors as well. The primitive QR code may not necessarily be human-readable or machine-readable. The primitive QR code may include any number of colors or textures. Further, the primitive QR code may have boundaries that do not vary from a QR code that has a typical white or black background. For example, the primitive QR code may have a same square shape as a typical QR code.

After the primitive QR code is generated, an overlay interface module 206 of the QR code generation system 200 may generate a user interface to display the graphical construct. The overlay interface module 206 can receive input from a user that is used to modify the primitive QR code to generate the graphical construct. For example, the user may input an emoji template as a text message and the overlay interface module 206 may generate the graphical construct by embedding the emoji template onto the primitive QR code. For example, the overlay interface module 206 may determine an alignment and/or location of the primitive QR code relative to a position of the emoji template.

Unlike existing graphics engines or applications, the overlay interface module 206 can identify locations within the primitive QR code that form part of the machine-readable QR code and distinguish those locations from portions of the primitive QR code that correspond to the embedded image. The overlay interface module 206 may, in response to one or more user inputs, automatically modify portions of the QR code. In some embodiments, the overlay interface module 206, in response to a single user input, automatically modifies portions of, or the entirety of, the primitive QR code. It is noted that, one or more modifications may be made sequentially to the primitive QR code. Each modification may result in an intermediate QR code that may be further modified by the user and/or the overlay interface module 206.

The overlay interface module 206 may provide one or more mechanisms used to modify the primitive QR code or the intermediate QR code. For example, the overlay interface module 206 may provide a mechanism whereby the user may modify a property of the primitive QR code or the intermediate QR code. For example, the mechanisms may include a tool for adjusting a saturation level, a brightness level, or a contrast level within the primitive or intermediate QR code.

The mechanisms may allow the user to dictate that a background portion of the primitive QR code or intermediate QR code is modified independently from the generated QR code itself. Conversely, the mechanisms may allow the user to dictate that the generated QR code of the primitive QR code or intermediate QR code is modified independently from the background. In some instances, the background may be modified without modifying the QR code and the QR code may be modified without modifying the background.

A testing module 208 can determine whether the primitive QR code or intermediate QR code is machine-readable. In some embodiments, the testing module 208 accesses the primitive QR code or intermediate QR code and provides an indication of whether the tested QR code is machine-readable. In some instances, the testing module 208 provides an indication that includes the decrypted alphanumeric characters read from the QR code. In some embodiments, the overlay interface module 206 may automatically request that each intermediate QR code be tested. The overlay interface module 206 may provide the indication as to whether the tested QR code is machine-readable within the user interface generated by the overlay interface module 206.

A Natural Language Processing (NLP) module 210 may capture one or more user intents of a received user input. For example, the received user input may be something like "Dear Johnny, Happy birthday bro," and the NLP module 210 can determine that the text already contains a lot of information as to the nature of the payment, and that information can be used to generate the expressive element of a digital content.

In some embodiments, the NLP module 210 may receive text specifying predetermined evidence; extract text (e.g. conditions, logical operators, and criteria for evidence); decompose the text into coarse grained text fragments, including grouping text segments as coarse grained text fragments using the logical operators; analyze each coarse grained text fragment to identify conditions within the coarse grained text fragment; evaluate each identified condition in accordance with the predetermined evidence; evaluate, each coarse grained text fragment based on the identified condition evaluations and the logical operators of the coarse grained text; and predict, from the evaluations of each coarse grained text fragments, one or more user intents of the received user input indicating a degree to which the evidence meets the criteria of the text. The NLP module 210 may be a module of computer program instructions that, when executed, cause a computer to perform natural language processing according to embodiments of the present invention by receiving, by the NLP module 210, text specifying predetermined evidence. An example of text specifying predetermined evidence is a data structure that includes a description of a person's emotional quotient, social behavior, personality, and so on. As described below in further detail, this 'evidence' may be compared to criteria to determine if the evidence meets the criteria. The predetermined evidence may be received from various entities in various ways, including, for example, from a user through a graphical user interface ('GUI') presented on a display of a computer or from a user through a website provided to the user for the purpose of gathering and compiling such evidence.

The NLP module 210 may receive a text passage to process. The term 'condition' as used in this specification refers to a qualification or requirement. The term logical operator, or 'logical connective,' is a symbol or word used to connect two or more clauses of sentences in a grammatically valid way, such that a compound sentence produced by the connection has a truth value dependent on the respective truth values of the original clauses.

The NLP module 210, after receiving the text passage, may decompose the text passage into coarse grained text fragments. The NLP module may decompose the text passage into coarse grained text fragments by grouping text segments in dependence upon the logical operators. The NLP module 210 then analyzes each coarse grained text fragment to identify conditions within the coarse grained text fragment and evaluates each identified condition in accordance with the predetermined evidence and predefined condition evaluation rules. Predefined condition evaluation rules specify a manner in which to evaluate a condition in light of evidence.

After evaluating each identified condition, the NLP module 210 evaluates each coarse grained text fragment in dependence upon the identified condition evaluations and the logical operators of the coarse grained text fragment. That is, the NLP module 210 determines whether the coarse grained text fragment is true in light of the logical operators and evaluations of the condition of the text fragment.

Referring again to FIG. 2, user intent store 212 can be a repository of user intents derived from a user input. A user intent disclosed herein can refer to a motivation or rationale of a user of a financial service provider to perform an online transaction using the financial service provider. In some embodiments, the user intent store 212 stores user intents captured by the NLP module 210. In alternate embodiments, the user intent store 212 stores user intents of the received user input based on the QR code generation system 122 determining one or more life events from the received user input. A life event could be, for example, a birthday, wedding, anniversary, new baby, death, or any other event in a person's life for which friends or relations send greetings, well wishes, congratulations, or condolences.

Figure 3:
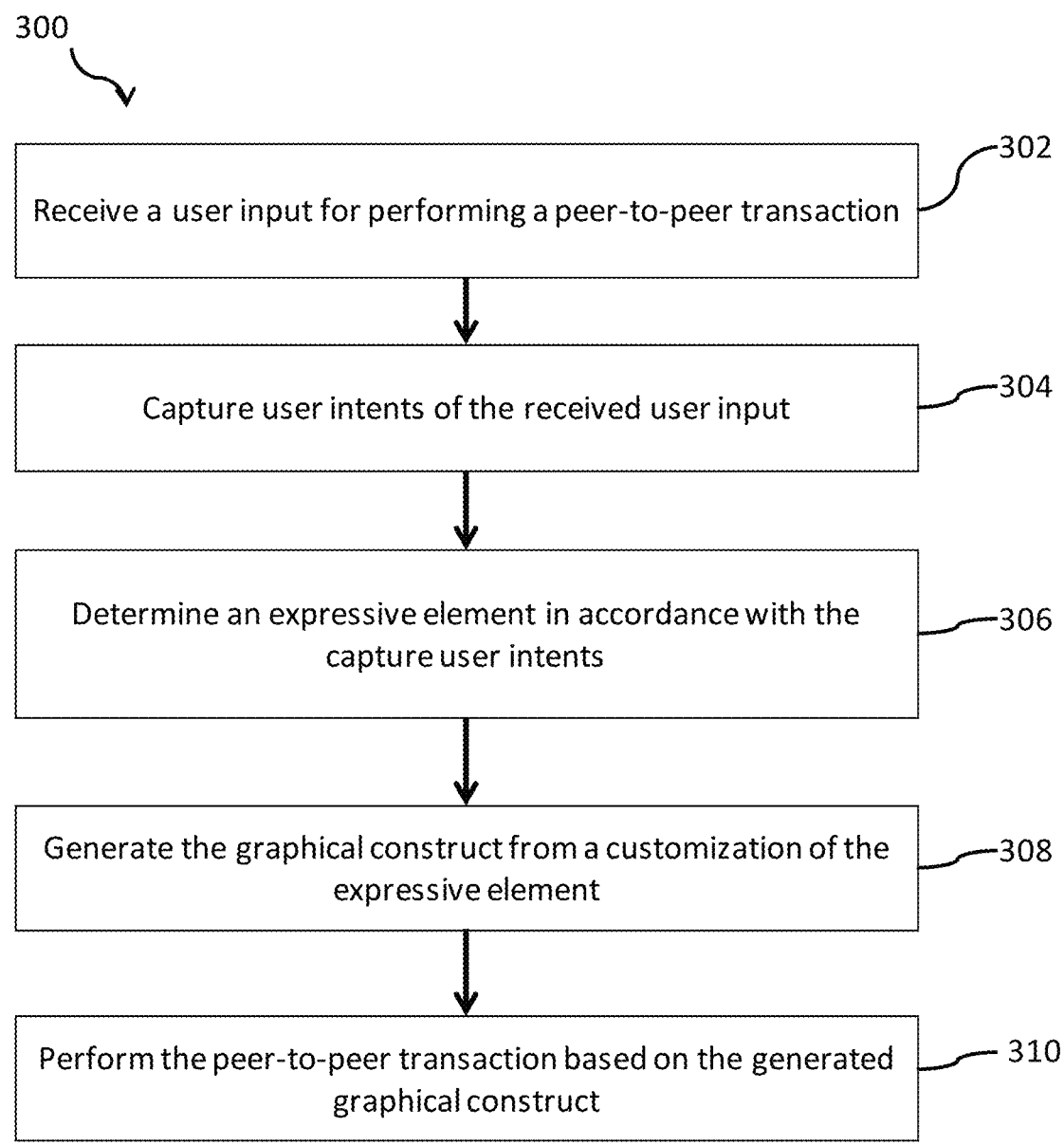
FIG. 3 is a flow diagram showing processing that may occur within the QR code generation system of FIG. 1, according to some embodiments of the present disclosure.

FIG. 3 is a flow diagram illustrating an exemplary process that may be performed by QR code generation system 122 of FIG. 1, according to some aspects of the present disclosure. Other entities may perform some or all of the steps of the process 300 in other embodiments. Likewise, embodiments may include different and/or additional steps, or perform the steps in different orders.

The QR code generation system 122 can receive 302 a user input for performing a peer-to-peer transaction. For example, the user may input text such as "Dear Johnny, Happy birthday bro," for performing the peer-to-peer transaction through a user device associated with a financial service provider.

The QR code generation system 122 can capture 304 user intents of the received user input. In some configurations, the QR code generation system 122 can capture user intents of the received user input based on natural language processing. In alternate configurations, the QR code generation system 122 can capture user intents of the received user input when the user inputs one or more life events from the received user input.

The QR code generation system 122 can determine 306 an expressive element in accordance with the captured user intents. For example, the expressive element is an emoji template having a QR code embedded with an image, a digital avatar, and optionally a text message.

The QR code generation system 122 can generate 308 the graphical construct from a customization of the expressive element. For example, the QR code generation system 122 dynamically adjusts at least one of a text represented in the expressive element, a color of the expressive element, a size of one or more elements inside the expressive element, an aspect ratio of a QR code, a location of the QR code, a placement of the expressive element on a content displayed on a mobile device, etc. In some configurations, the QR code generation system 122 can make the QR code to appear on an image of the digital avatar. In alternate configurations, the QR code generation system 122 customizes the expressive element in accordance with a payment information (e.g. recipient, date of transaction, amount, purpose of transaction, etc.). In yet another configuration, the QR code generation system 122 customizes the expressive digital content by identifying one or more sentiments (e.g. birthday gift, holiday gift) or intents (e.g., loan pay back, rent money) associated with the peer-to-peer transaction, and modifying a QR code of the expressive element in accordance with the identified sentiments.

The QR code generation system 122 can at step 310 perform the peer-to-peer transaction based on the generated graphical construct. In some configurations, the QR code generation system 122 can receive the generated graphical construct (including the customized expressive element), extract payment information from the payment QR code, and perform the online payment associated with the peer-to-peer transaction in accordance with the extracted payment information.

Figure 4:
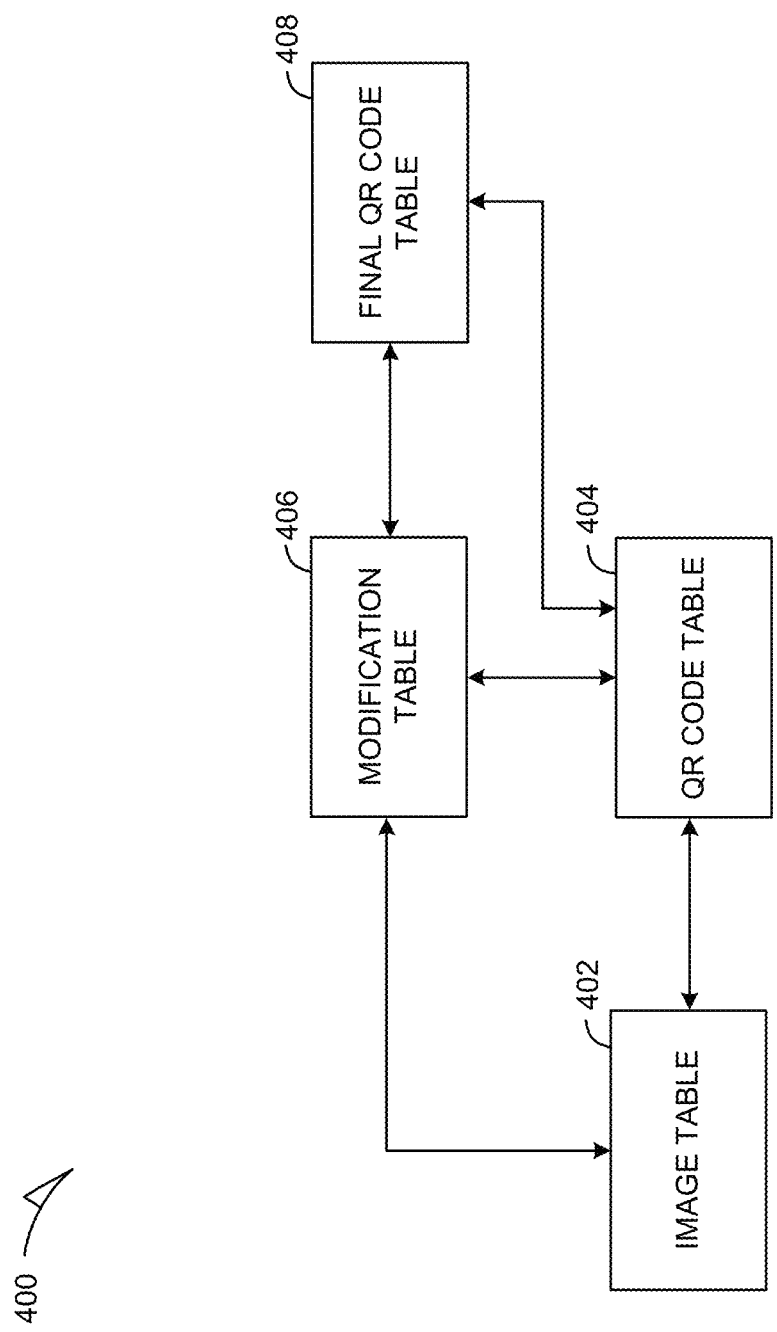
FIG. 4 is a high level diagram of one or more example tables that may be maintained by the QR code generation system of FIG. 1, according to some embodiments of the present disclosure.

FIG. 4 is a high level diagram of one or more example tables that may be maintained by the QR code generation system of FIG. 1, according to some embodiments of the present disclosure.

An image table 402 may contain information about one or more images. The information about an image may include an image file or a pointer to an image file. An image file may be composed of pixels, vector (geometric) data, or a combination of the two. The pixels that constitute an image may be ordered as an array (columns and rows); each pixel consisting of numbers representing magnitudes of brightness and color. The image table 402 may include resizing information about the image for changing the dimensions of the image so that it matches the dimensions of a QR code. The image table 402 may further include an indication corresponding to each pixel that indicates whether the pixel is in the foreground or the background of the image. In some embodiments, the image may have multiple layers, in addition to the foreground and the background.

A QR code table 404 may contain information about the QR code. In some embodiments, the QR code may be an image file. In some instances, for each pixel in the QR code, the QR code table 404 may include an additional indication as to whether the pixel is part of the QR code (e.g., the black portions of the QR code) or part of the background of the QR code (e.g., the white background of the QR code).

A modification table 406 may contain information about the primitive QR codes and/or intermediate QR codes generated by the QR code generation system 200. The modification table 406 may include an image file or include a pointer to an image file used to store the intermediate QR code. The modification table 406 may include, for each pixel, additional pieces of information. The first additional piece of information may include an indication as to whether the pixel in the intermediate QR code corresponds to a pixel in the image background or the image foreground. The second additional piece of information may include an indication as to whether the pixel in the intermediate QR code corresponds to a pixel in the QR code or the background of the QR code.

A final QR code table 408 may contain information about the QR code with the embedded image provided to the user. The final QR code table 408 may include an image file having a readily available file format. The final QR code table 408 may not include the additional information included in the modification table 406.

Figure 5A:
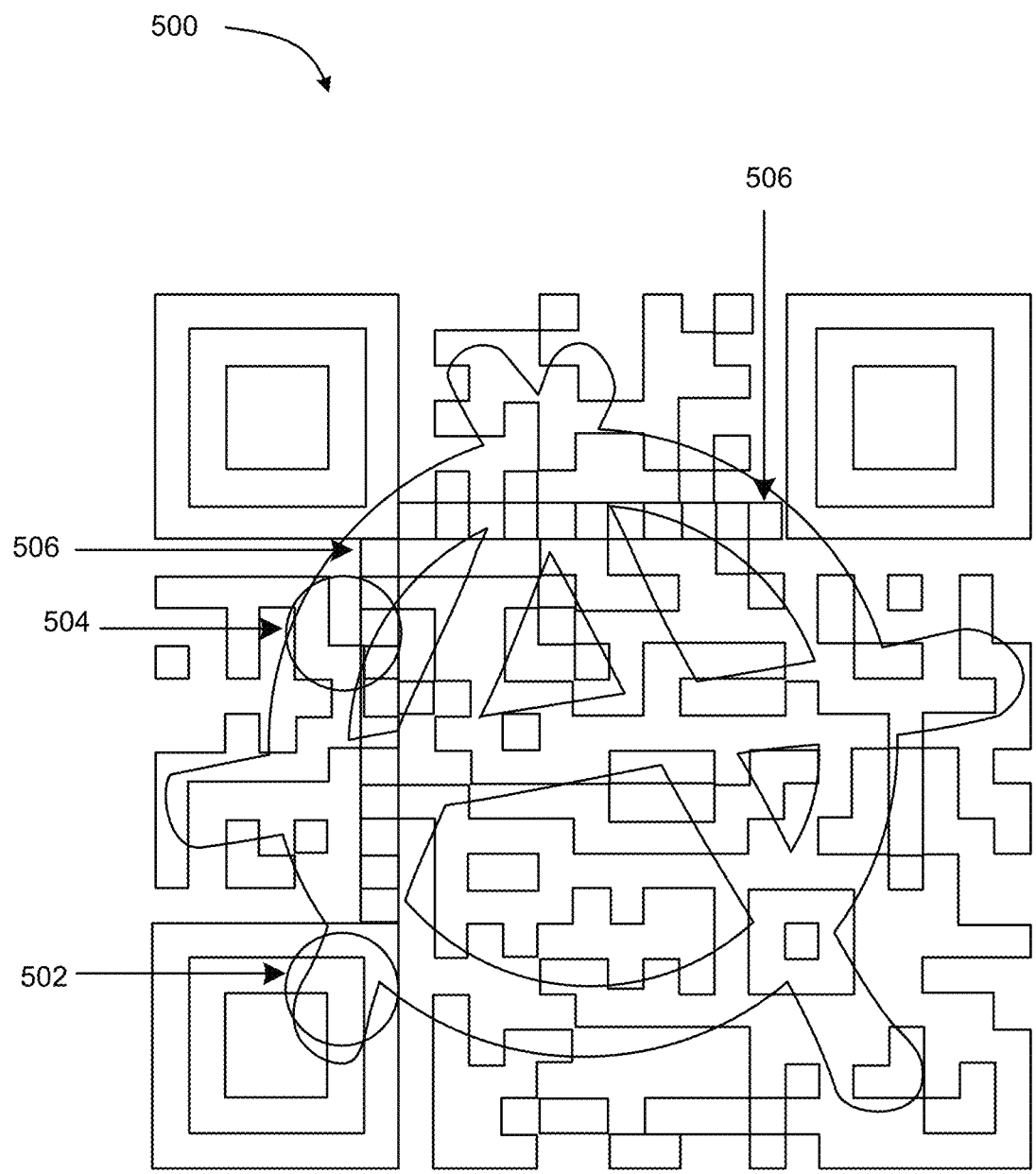
FIG. 5A is an example of a QR code having an image embedded therein generated by the QR code generation system of FIG. 1, according to some embodiments of the present disclosure.

FIG. 5A is an example two-dimensional representation of a QR code with an image embedded therein generated by the QR code generation system 122 of FIG. 1, according to some embodiments of the present disclosure. As depicted, the QR code has an image of a circled letter "A" on a white background. The QR code and the image have approximately the same dimensions. The QR code appears as a whole and is not divided into two or more portions. However, in other embodiments, the QR code may be divided into two or more portions where the embedded image appears within one or more of the portions.

In the image, the letter "A" is the foreground of the image while the circle around the letter "A" is a background of the image. The image may have a second, white background or the QR code itself may be generated on a white background that appears as the background in QR code 500.

The circled portion 502 encloses a machine-readable portion of the QR code 500 where the foreground of the image overlaps with a portion of the QR code. In some embodiments, the color gradients of the image may be adjusted based on color gradients of the overlapped QR code, or vice versa. For example, the portions of the image foreground that overlap with a black portion of the QR code may be a bright, tomato red in the portion 502. In the portion 502, the portions of the image foreground that overlap with the white background of the QR code may be a lighter, pink color.

The circled portion 504 encloses a machine-readable portion of the QR code 500 where the background of the image overlaps with a portion of the QR code. For example, the portions of the image background that overlap with a black portion of the QR code may be a darker, burgundy red in the portion 502. In the portion 504, the portions of the image foreground that overlap with the white background of the QR code may be a lighter, gray color.

It is further noted that part of circled portion 504 of the embedded image overlaps with timing information included in the QR code. Boxes 506 indicate the location of the timing information within the QR code. The timing information is a series of alternating active and background portions of the QR code. As shown, the image is embedded in the QR code 500 without interrupting the timing pattern. As such, the timing portion of the QR code is said to be continuous. The original dimensions of the generated QR code are maintained after the image is embedded into the QR code.

Example of Improved User Interface with Expressive Digital Content

Figure 5B:
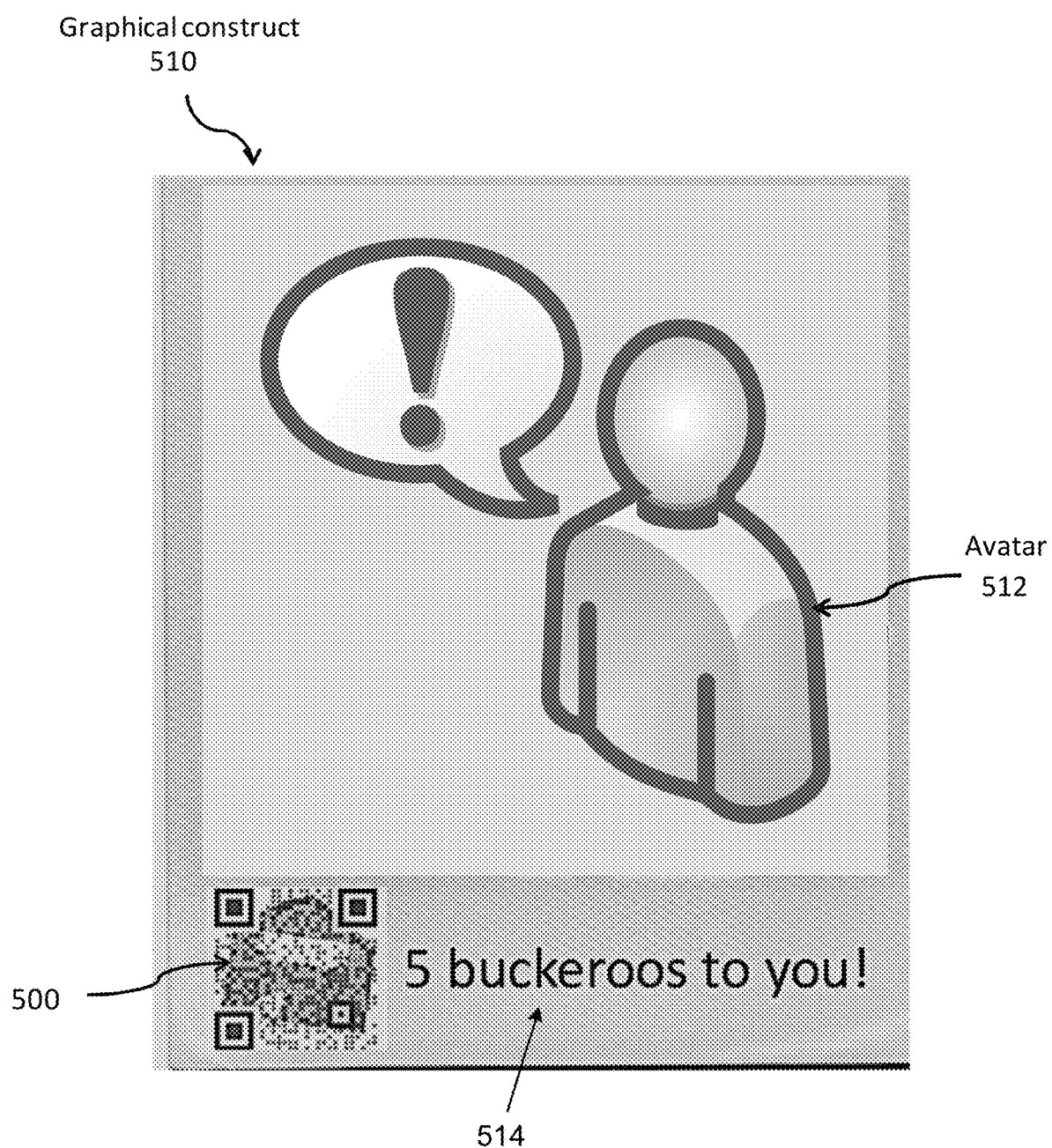
FIG. 5B is an example of a graphical construct with a QR code having an image embedded therein generated by the QR code generation system of FIG. 1, according to some embodiments of the present disclosure.

FIG. 5B is an example of a graphical construct 510 with a QR code having an image embedded therein generated by the QR code generation system 122 of FIG. 1, according to some embodiments of the present disclosure. In the example of FIG. 5B, the graphical construct 510 includes the QR code 500, an avatar 512, and a text 514 (e.g. Five Buckeroos to you!).

The graphical construct 510 may be generated by dynamically adjusting an aspect ratio of the QR code 500, a location of the QR code 500, a color of the avatar 512, a size of the avatar 512, a size of the text 514, a font of the text 514, etc. For example, dynamic adjustments may include adjusting the aspect ratio of the QR code to be proportional to the avatar, adjusting the location of the QR code to be in a location that can fit the QR code, adjusting the color of the avatar to correspond to a color of a background or of a QR code, adjusting a size of the avatar based on a size of a QR code, adjusting the size of a text so based on a size of a QR code or avatar, or any other adjustments that add contrast or blending in color or light, or that make objects in the graphical construct appear in proportion. The QR code 500 may also appear on the avatar 512. The QR code 500 may be a series of black and white boxes, or the boxes in the QR code 500 may be a different color, or the QR code 500 may include embedded images.

The avatar 512 may be, for example, a graphic illustrating somebody holding a birthday cake, or someone waving, depending on the intent captured from a user input, either through a text string or by selecting from a menu of options. In some embodiments, a customer of a financial service provider (e.g. Capital One) may turn on their camera and take a picture, such as some type of selfie pose. The financial service provider may use a software application to turn the picture of the person into a caricature that forms the avatar 512. The person could, for example, take a picture of himself pretending to hold a birthday cake, and the person could add a sticker of a birthday cake on top of it. The sticker may be an image the person overlays on top of the picture. The financial service provider may embed the QR code into the sticker. For example, the financial service provider may have already created a bunch of stickers in advance that automatically know where in the sticker the QR code should be located. In some configurations, if the financial service provider created a caricature of a user based on a picture of the user, the financial service provider may identify the user's t-shirt or hat and determine whether the graphical construct 510 has a large enough space for the QR code 500. The financial service provider may identify a primary color of the image embedded into the QR code 500, and may adjust the color of the QR code 500 accordingly.

Example Machine Architecture and Machine-Readable Medium

Figure 6:
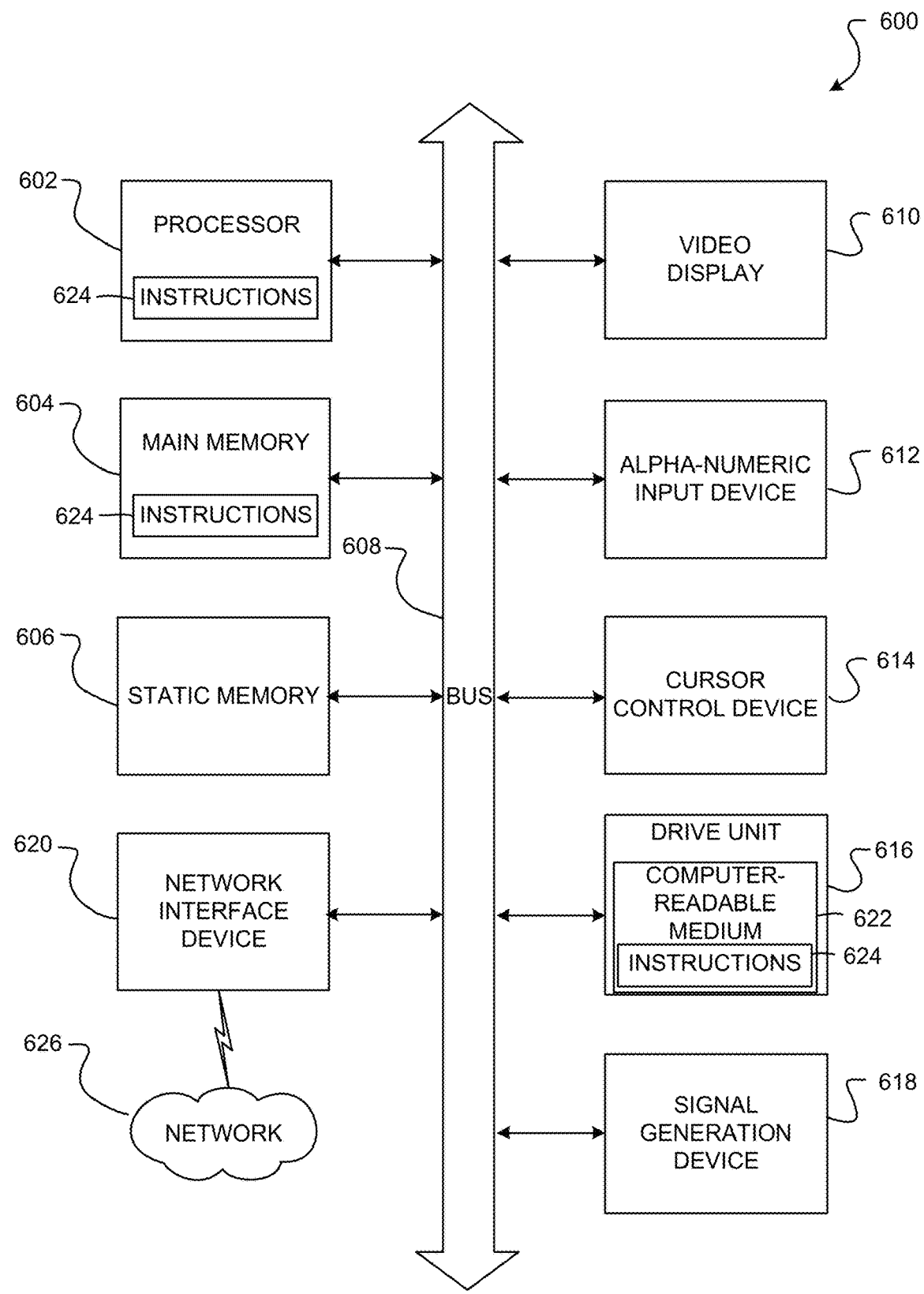
FIG. 6 is a block diagram of machine in the example form of a computer system within which a set instructions, for causing the machine to create a graphical construct, may be executed, according to some embodiments of the present disclosure.

FIG. 6 is a block diagram of a machine in the example form of a computer system 600 within which a set of instructions, for causing the machine to create a graphical construct, may be executed, according to some embodiments of the present disclosure. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD), a cathode ray tube (CRT), or a touch screen). The computer system 600 also includes an alphanumeric input device 612 (e.g., a keyboard or a touch screen), a user interface (UI) navigation device 614 (e.g., a mouse or a touch screen), a disk drive unit 616, a signal generation device 618 (e.g., a speaker) and a network interface device 620.

Machine-Readable Medium

The disk drive unit 616 includes a machine-readable medium 622 on which is stored one or more sets of instructions and data structures (e.g., software) 624 embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

CONCLUSION

The foregoing description of the embodiments of the present disclosure has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the present disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the present disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the present disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the subject matter described herein. It is therefore intended that the scope of the disclosed embodiments be limited not by this detailed description, but rather by any claims that issue on an application based hereon. Accordingly, the disclosed embodiments are intended to be illustrative, but not limiting, of the scope of the invention, which is set forth in the following claims.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

Additionally, the software included as part of the concepts, structures, and techniques sought to be protected herein may be embodied in a computer program product that includes a computer-readable storage medium. For example, such a computer-readable storage medium can include a computer-readable memory device, such as a hard drive device, a CD-ROM, a DVD-ROM, or a computer diskette, having computer-readable program code segments stored thereon. In contrast, a computer-readable transmission medium can include a communications link, either optical, wired, or wireless, having program code segments carried thereon as digital or analog signals. A non-transitory machine-readable medium may include but is not limited to a hard drive, compact disc, flash memory, non-volatile memory, volatile memory, magnetic diskette, and so forth but does not include a transitory signal per se. In describing exemplary embodiments, specific terminology is used for the sake of clarity. For purposes of description, each specific term is intended to at least include all technical and functional equivalents that operate in a similar manner to accomplish a similar purpose.

Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A method for performing a peer-to-peer transaction with a graphical construct on a first mobile device comprising a processor, the method comprising:
   receiving, by the processor, a user input for performing the peer-to-peer transaction;
   capturing, by the processor, one or more user intents of the received user input;
   determining, by the processor, an expressive element in accordance with the captured one or more user intents;
   generating, by the processor, the graphical construct by customizing the expressive element, the customizing comprising identifying one or more sentiments associated with the peer-to-peer transaction and visually modifying a QR code of the expressive element in accordance with the identified one or more sentiments;
   embedding, by the processor, payment information within the graphical construct; and
   performing, by the processor, the peer-to-peer transaction with a second mobile device in communication with the first mobile device by presenting the generated graphical construct.

2. The method of claim 1, wherein capturing one or more user intents of the received user input further comprises:
   receiving, by a natural language processing (NLP) module coupled to the processor, text specifying predetermined evidence;
   extracting, by the NLP module, text in the user input, the one or more text comprising conditions, logical operators, and criteria for evidence;
   decomposing, by the NLP module, the text into coarse grained text fragments, including grouping text segments as coarse grained text fragments using the logical operators;
   analyzing, by the NLP module, each coarse grained text fragment to identify conditions within the coarse grained text fragment;
   evaluating, by the NLP module, each identified condition in accordance with the predetermined evidence;
   evaluating, by the NLP module, each coarse grained text fragment based on the identified condition evaluations and the logical operators of the coarse grained text fragment; and
   predicting, by the NLP module, from the evaluations of each coarse grained text fragments, one or more user intents of the received user input indicating a degree to which the evidence meets the criteria of the text.

3. The method of claim 1, wherein capturing one or more user intents of the received user input is based on determining one or more life events from the received user input.

4. The method of claim 1, wherein customizing the expressive element comprises determining a placement of the expressive element on a content displayed on the first mobile device.

5. The method of claim 1, wherein customizing the expressive element comprises performing a modification of a text represented in the expressive element.

6. The method of claim 1, wherein customizing the expressive element comprises performing a modification of a size of one or more objects within the expressive element.

7. The method of claim 1, wherein customizing the expressive element comprises performing a modification of an aspect ratio of a payment QR code.

8. The method of claim 1, wherein the processor is configured to determine the expressive element by overlaying a human-readable image onto a machine-readable QR code.

9. A system for performing a peer-to-peer transaction between a first mobile device and a second mobile device using a graphical construct, the system comprising:

a database;
an application server; and
one or more processors configured to:
- receive a user input from the first mobile device for performing the peer-to-peer transaction;
- capture one or more user intents of the received user input;
- determine an expressive element in accordance with the captured one or more user intents;
- generate the graphical construct by customizing the expressive element, the customizing comprising a visual modification of the expressive element and determining a placement of the expressive element on a content displayed on the first mobile device;
- embed payment information within the graphical construct;
- present the graphical construct to the second mobile device in communication with the first mobile device; and
- perform an online payment associated with the peer-to-peer transaction based on the presented graphical construct.

10. The system of claim 9, wherein the one or more processors capture one or more user intents of the received user input based on determining one or more life events from the received user input.

11. The system of claim 9, wherein customizing the expressive element comprises:
- identifying one or more sentiments associated with the peer-to-peer transaction; and
- modifying a QR code of the expressive element in accordance with the identified one or more sentiments.

12. The system of claim 9, wherein customizing the expressive element comprises performing a modification of a text represented by the expressive element.

13. The system of claim 9, wherein customizing the expressive element comprises performing a modification of at least one of: a size of one or more objects within the expressive element, or an aspect ratio of a payment QR code.

14. The system of claim 9, wherein the one or more processors are configured to determine the expressive element by overlaying a human-readable image onto a machine-readable QR code.

15. The system of claim 9, wherein the one or more processors capture one or more user intents of the received user input by a natural language processing (NLP) module coupled to the one or more processors, the NLP module configured to:
- receive one or more text specifying predetermined evidence;
- extract one or more text in the user input, the one or more text comprising conditions, logical operators, and criteria for evidence;
- decompose the text into coarse grained text fragments, including grouping text segments as coarse grained text fragments using the logical operators;
- analyze each coarse grained text fragment to identify conditions within the coarse grained text fragment;
- evaluate each identified condition in accordance with the predetermined evidence;
- evaluate each coarse grained text fragment based on the identified condition evaluations and the logical operators of the coarse grained text fragment; and
- predict from the evaluations of each coarse grained text fragments, one or more user intents of the received user input indicating a degree to which the evidence meets the criteria of the text.

* * * * *